US006822936B2

(12) United States Patent
Ono et al.

(10) Patent No.: US 6,822,936 B2
(45) Date of Patent: Nov. 23, 2004

(54) DISC DISCRIMINATING METHOD AND INFORMATION REPRODUCING APPARATUS USING THEREOF

(75) Inventors: Kazuhiko Ono, Tokyo (JP); Hirotoshi Fukuda, Kanagawa-ken (JP); Takeshi Ikeda, Tokyo (JP)

(73) Assignees: Hitachi, Ltd., Tokyo (JP); Hitachi-LG Data Storage Co., Ltd., Tokyo (JP)

( * ) Notice: Subject to any disclaimer, the term of this patent is extended or adjusted under 35 U.S.C. 154(b) by 564 days.

(21) Appl. No.: 09/910,586

(22) Filed: Jul. 20, 2001

(65) Prior Publication Data

US 2002/0150017 A1 Oct. 17, 2002

(30) Foreign Application Priority Data

Apr. 13, 2001 (JP) ........................................ 2001-114767

(51) Int. Cl.[7] .............................. G11B 5/09; G11B 7/00
(52) U.S. Cl. ................. 369/53.23; 369/44.26; 369/53.2
(58) Field of Search ........................... 369/53.2, 53.22, 369/53.23, 94, 44.26, 44.29

(56) References Cited

U.S. PATENT DOCUMENTS

| 5,764,610 | A | * | 6/1998 | Yoshida et al. | .......... | 369/53.22 |
| 5,903,531 | A | * | 5/1999 | Satoh et al. | ............. | 369/53.23 |
| 6,424,605 | B1 | | 7/2002 | Iida | | |
| 6,466,531 | B1 | * | 10/2002 | Lee | .......... | 369/53.23 |
| 6,556,302 | B2 | * | 4/2003 | Ishihara | ....... | 369/94 |

FOREIGN PATENT DOCUMENTS

| JP | 08-249801 | 9/1996 |
| JP | 09-044982 | 2/1997 |
| JP | 10-241269 | 9/1998 |
| JP | 10-334574 | 12/1998 |
| JP | 11-306650 | 11/1999 |
| JP | 2000-311427 | 11/2000 |

* cited by examiner

*Primary Examiner*—Thang V. Tran
(74) *Attorney, Agent, or Firm*—Townsend and Townsend and Crew LLP

(57) ABSTRACT

The invention relates to a disc discriminating method and an optical disc information reproducing apparatus wherein DVD-RAM which is DVD-RAM1 or DVD-RAM2 and DVDRW which is DVD–RW or DVD+RW which cannot be respectively determined based upon distance from the surface of a disc to the recording face, the number of recording faces and the reflectance can be discriminated. In case an optical disc is DVD-RAM or DVDRW, the amplitude of a push-pull tracking error signal is measured by a microcomputer in a state in which servo control is executed based upon a focus error signal. Determination is performed based upon the amplitude of the push-pull tracking error signal, when the amplitude of the push-pull tracking error signal is larger than a predetermined value, the optical disc is judged as DVD-RAM and when the amplitude is smaller than the predetermined value, the optical disc is judged as DVDRW.

14 Claims, 7 Drawing Sheets

DISC DISCRIMINATING METHOD AND INFORMATION REPRODUCING APPARATUS USING THEREOF

BACKGROUND OF THE INVENTION

The present invention relates to technique for reproducing or recording data from/to an optical disc.

For a medium for recording information, a magnetic tape and a disc can be given.

For the magnetic tape, a magnetic tape on which analog signals are serially recorded for a long time such as one used in VTR is well-known.

In the meantime, for the disc, an optical disc on which digital information is recorded can be given, it is used for an external storage of a computer and an apparatus for recording or reproducing an aural signal or a picture signal to/from an optical disc has been manufactured. As information can be recorded or reproduced to/from an optical disc at random, compared with a magnetic tape on which information is serially recorded, the optical disc has a merit that access to information is promptly enabled.

The above-mentioned optical disc has various types such as a compact disc (CD) and a digital video disc (a digital versatile disc) (DVD), for CD, a compact disc read only memory (CD-ROM), a compact disc-recordable (CD-R) and CD-rewritable (CD-RW) are known and for DVD, there are single-layer DVD-read only memory (DVD-ROM), dual-layer DVD-ROM, DVD-recordable (DVD-R), DVD-random access memory version 1.0 (DVD-RAM1) DVD-RAM2, DVD–RW and DVD+ReWritable (DVD+RW) (a rewritable DVD standard settled by Sony Corporation, Philips Electronics, Hewlett Packard, Mitsubishi Chemical Industries, Ltd., Ricoh Co., Ltd. and Yamaha Motor Co., Ltd. and called Phase-Change ReWritable).

As some of these plural types of optical discs are different in a method of recording and reproducing information, each optical disc is required to be switched. Therefore, the type of an optical disc to/from which information is to be recorded or reproduced is required to be discriminated.

For reference examples of discriminating an optical disc, Japanese unexamined publication No. H11-306650, No. H10-334574, No. H9-44982 and No. H8-249801 can be given.

SUMMARY OF THE INVENTION

However, in the above-mentioned reference examples, technique for discriminating a disc the reflected light quantity, the distance to a recording face and the recording track pitch of which are small is not referred and for a discriminating method, realizing means is not disclosed.

For example, DVD-RAM which is DVD-RAM1 or DVD-RAM2 and DVDRW which is DVD–RW or DVD+RW are substantially equal in reflected light quantity and distance to a recording face.

For recording track pitch, each track pitch of DVD-RAM and DVDRW is also smaller than each track pitch of CD and DVD.

Therefore, for a method of discriminating DVD-RAM and DVDRW, a new discriminating method is required to be discussed in addition to a method based upon reflected light quantity, distance to a recording face and recording track pitch.

Japanese published unexamined patent publication No. H11-306650 discloses a method of synthetically discriminating a disc after beams are once necessarily emitted from both laser beam sources for CD and for DVD and reflected signals based upon reflected light by both laser beam sources for CD and for DVD, a focus error signal and a tracking error signal are all acquired, however, the process is complex.

The object of the invention is to solve the above-mentioned problems and to provide disc discriminating method and apparatus by which an optical disc can be easily discriminated.

To achieve the object of the invention, a disc discriminating method according to the invention includes a step for discriminating the type of an optical disc installed in an optical disc unit based upon the reflectance, a step for discriminating the type of the optical disc based upon the time of a reflected signal from the surface of the optical disc and the time of the reflected signal from the recording face and a step for discriminating the type of the optical disc based upon a tracking error signal acquired from the optical disc.

Further, in addition to the above-mentioned steps, a step for determining the number of recording layers of an optical disc based upon a focus error signal acquired from the recording face of the optical disc and/or a step for discriminating the type of the optical disc depending upon the amplitude values of the reflected lights of laser beams from different lasers may be also together or selectively added.

First, in the step for discriminating the type of the optical disc based upon a tracking error signal acquired from the optical disc, the amplitude of a push-pull tracking error signal is acquired in a state in which focus servo is executed, is compared with a predetermined value and the type of the optical disc is discriminated.

That is, some optical discs are different in the sensitivity of a push-pull tracking error signal and as the difference in the sensitivity makes difference in the amplitude value of the tracking error signal, an optical disc can be discriminated based upon the difference.

For example, it is known that when DVD-RAM which is DVD-RAM1 or DVD-RAM2 and DVDRW which is DVD–RW or DVD+RW are compared, DVD-RAM is larger than DVDRW in the amplitude value of the tracking error signal.

Therefore, in case the amplitude of a tracking error signal is larger than a predetermined value, an optical disc is judged as DVD-RAM and in case the amplitude is smaller than the predetermined value, the optical disc can be judged as DVDRW.

Next, in the step for discriminating the type of an optical disc based upon the reflectance of the optical disc, the type of the optical disc is discriminated by determining whether the amplitude of a focus error signal acquired from the optical disc is larger than a predetermined value or not.

Generally, it is known that when optical discs are sorted in the order of higher reflectance, they are sorted in the order of CD, single-layer DVD (however, as difference in reflectance between CD and single-layer DVD is small, it may be also described that they are equal in reflectance), CD-R, dual-layer DVD, CD-RW, DVDRW (DVD–RW or DVD+RW) and DVD-RAM (however, as difference in reflectance among CD-RW, DVD-RAM and DVDRW is small, it may be also described that they are equal in reflectance).

Therefore, the type of an optical disc can be discriminated by presetting the amplitude values for comparison of focus error signals from these optical discs and comparing the preset amplitude value and the amplitude of a focus error signal from each optical disc.

For example, in the step for discriminating the reflectance of an optical disc, CD and single-layer DVD can be discriminated as an optical disc the reflectance of which is large, and CD-RW, DVDRW and DVD-RAM can be discriminated as an optical disc the reflectance of which is small.

In the step for discriminating the type of an optical disc, as there is difference between time until a reflected signal from the surface of the optical disc is acquired and time until a reflected signal from the recording face of the optical disc is acquired, the type of the optical disc is discriminated based upon the difference between the times.

For example, for CD and DVD, it is generally known that CD is larger in the difference between the times.

Therefore, for CD and DVD, in case the difference between the times is longer than predetermined time, the optical disc can be judged as CD and in case the difference is shorter, the optical disc can be judged as DVD.

In the step for determining the number of recording layers of an optical disc based upon a focus error signal acquired from the recording face of the optical disc, the number of focus error signals acquired when an optical pickup provided to the optical disc unit is brought close to the installed optical disc or is separated from it is counted.

For example, DVD the number of focus error signals acquired from the recording face of which is one can be determined as single-layer DVD and DVD the number of focus error signals acquired from the recording faces of which is two can be determined as dual-layer DVD.

In the step for discriminating the type of an optical disc depending upon difference in the amplitude values of the reflected lights of laser beams from different lasers, the type of the optical disc is discriminated by switching a first laser and a second laser and measuring difference between reflected signals or counting the number of reflected signals.

Generally, it is known that difference in the amplitude value of the reflected light of the radiated laser beam is made depending upon an optical disc on which a laser beam is radiated.

For example, in case a laser beam for DVD is radiated on CD-R, no reflected light the amplitude of which is large is acquired.

Therefore, for CD and CD-R, in case the amplitude value of a focus error signal by a CD laser is larger than that of a focus error signal by a DVD laser when CD lasers beam and DVD laser beams are radiated, the corresponding optical disc can be judged as CD-R. Of course, a predetermined value is set beforehand, the corresponding optical disc for which two focus error signals having the amplitude larger than the predetermined value are acquired may be also judged as CD and the corresponding optical disc for which only one focus error signal is acquired may be also judged as CD-R.

A method of radiating different laser beams is not limited to the above-mentioned method and may be also a method of acquiring a focus error signal, approaching the optical pickup of the optical disc unit toward an optical disc using either of the first laser or the second laser, acquiring a focus error signal, separating the optical pickup from the optical disc using the other laser, comparing the amplitude values of the acquired focus error signals and counting the numbers.

For a method of discriminating DVD-RAM and DVDRW after the corresponding optical disc is determined as either of DVD-RAM or DVDRW, the following disc discriminating method is also useful.

First, suppose that a focus servo and a tracking servo are operated under setting for DVD-RAM in the optical disc unit. Next, it can be determined based upon a frequency of an acquired wobble signal whether the corresponding optical disc is DVD-RAM or DVDRW.

Generally, a standard determines so that frequencies of a wobble signal are different between DVD-RAM and DVDRW.

Therefore, in the above-mentioned case, if the frequency of an acquired wobble signal indicates DVD-RAM, the corresponding optical disc can be determined as DVD-RAM.

Of course, a method according to the invention is not limited to the method of acquiring a wobble signal after DVD-RAM is set as described above and for example, after DVD-RAM is set, information on an optical disc can be reduced. Or an optical disc may be also judged as DVD-RAM if address information is acquired from an optical disc.

Therefore, discrimination in case an optical disc is DVDRW in the above-mentioned case is different from may be also performed based upon that the frequency of a wobble signal is different from the frequency for DVD-RAM after DVD-RAM is set, that no information on the optical disc cannot be reproduced or that no address information is acquired from the optical disc.

Of course, DVDRW is first set and it may be also determined whether an optical disc is DVDRW or DVD-RAM after the similar processing to the above-mentioned one is executed.

In this case, for discrimination between DVD-RAM and DVDRW, the invention provides a disc discriminating method of discriminating DVD-RAM and DVDRW. Further, the invention also provides a disc information reproducing apparatus characterized in that DVD-RAM and DVDRW are discriminated.

The disc discriminating method of discriminating DVD-RAM and DVDRW is based upon the above-mentioned disc discriminating method.

The disc information reproducing apparatus that discriminates DVD-RAM and DVDRW determines whether the corresponding optical disc is DVD-RAM or DVDRW based upon a signal acquired from the optical disc.

The disc information reproducing apparatus is provided with an optical pickup that radiates a laser beam on an optical disc and detects a signal based upon reflected light from the optical disc, an information reproducing circuit (a regenerative signal processing circuit that executes processing for reproducing information acquired from the optical disc, which at least includes a regenerative signal demodulating circuit) that reproduces information recorded on the optical disc based upon the signal detected by the optical pickup, a focus error signal generating circuit that generates a focus error signal based upon the signal detected by the optical pickup, a tracking error signal generating circuit that generates a tracking error signal based upon the signal detected by the optical pickup, a wobble signal extracting circuit that extracts a wobble signal from the signal detected by the optical pickup, an actuator (a focusing actuator and a tracking actuator) that controls the position of a laser beam radiated from the optical pickup, a disc motor that rotates the optical disc, a driving circuit that drives the actuator and the disc motor, a servo control circuit that controls the driving circuit based upon the focus error signal or the tracking error signal and a control circuit that at least controls the information reproducing circuit and the servo control circuit.

A disc information reproducing apparatus that discriminates DVD-RAM and DVD–RW or DVD+RW based upon a tracking error signal acquired from the tracking error signal generating circuit in the above-mentioned configuration is provided.

Or a disc information reproducing apparatus that discriminates DVD-RAM and DVD–RW or DVD+RW based upon a wobble signal acquired from the wobble signal extracting circuit in the above-mentioned configuration is provided.

The above-mentioned information reproducing circuit (the regenerative signal processing circuit that executes processing for reproducing information acquired from an optical disc, which at least includes the regenerative signal demodulating circuit) reproduces information recorded on the optical disc. However, an apparatus that records information on an optical disc is provided with an information recording circuit, the information recording circuit executes processing for recording information on the optical disc and at least includes a recording signal processing circuit and a recording signal modulating circuit.

The above-mentioned optical disc discriminating method is a method of discriminating a disc based upon the amplitude of a tracking error signal, reflected light quantity, reflex time, the number of reflected signals, the amplitude of reflected light by a laser, the frequency of an acquired wobble signal (however, depending upon whether a wobble signal is acquired or not) and whether reproduction is possible under predetermined setting or not, however, the order and the combination of these can be freely set according to the type of the optical disc to be discriminated and a situation of the discrimination. The number of steps for processing for discrimination and time required for discrimination can be also changed by changing the order and the combination. It is also similar in the disc information reproducing apparatus.

The above-mentioned predetermined value is required to be set in consideration of a situation in which the above-mentioned discriminating method is executed. That is, the sensitivity of the optical pickup or the gain of a used amplifier in case the above-mentioned discriminating method is executed can be varied. Therefore, these factors are also required to be considered to set a predetermined value. However, even if there are various factors, a value at which a disc can be discriminated is required to be set as a predetermined value.

Further, only the reproducing apparatus is described above, however, the invention can be also applied to a recording apparatus.

DESCRIPTION OF THE PREFERRED EMBODIMENTS

Figure 1:
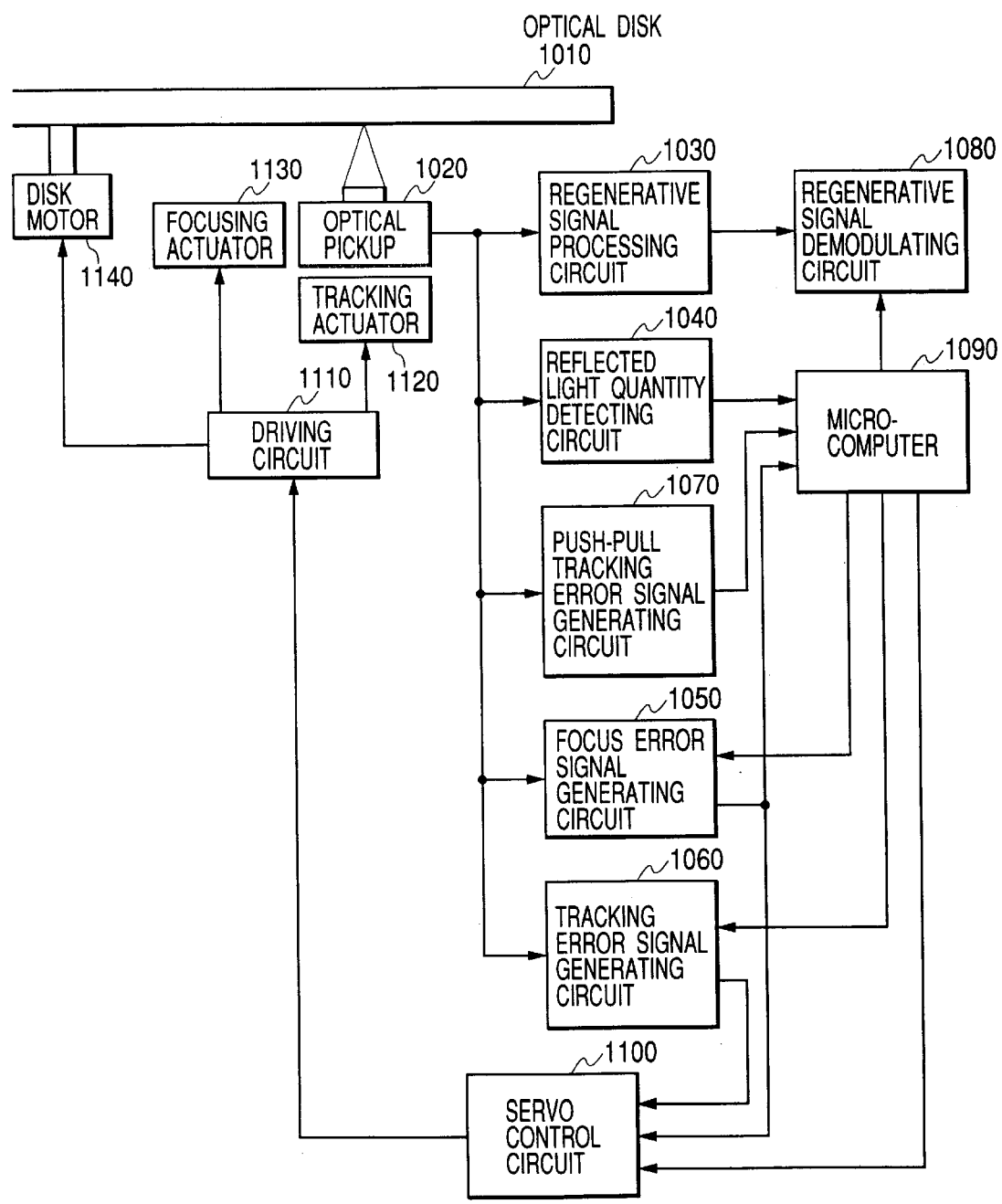
FIG. 1 is a block diagram showing the schematic configuration of an optical disc information reproducing apparatus equivalent to a first embodiment of the invention.

Referring to attached drawings, a first embodiment of the invention will be described below. FIG. 1 is a block diagram showing the schematic configuration of an optical disc information reproducing apparatus that discriminates a disc equivalent to the first embodiment of the invention. An optical pickup 1020 radiates a laser beam on an optical disc 1010 and outputs information on the disc to a regenerative signal processing circuit 1030 as electric information based upon the reflected light. A regenerative signal the amplitude of which is corrected in the regenerative signal processing circuit 1030 is demodulated in a regenerative signal demodulating circuit 1080 and information recorded on the optical disc 1010 is reproduced.

A focus error signal generating circuit 1050 generates a focus error signal which is a signal showing an error in the focal direction of the focus of a laser beam based upon the electric information input from the optical pickup 1020, and a tracking error signal generating circuit 1060 generates a tracking error signal which is a signal showing an error in the tracking direction of the focus of a laser beam based upon the electric information input from the optical pickup 1020. A servo control circuit 1100 controls the focus of a laser beam in the focal direction via a driving circuit 1110 and a focusing actuator 1130 based upon the focus error signal generated in the focus error signal generating circuit 1050 so that the focus of a laser beam is matched with the recording face of the optical disc 1010, and controls the focus of a laser beam in the tracking direction via the driving circuit 1110 and a tracking actuator 1120 based upon the tracking error signal generated in the tracking error signal generating circuit 1060 so that the focus of a laser beam tracks a recording track on the optical disc 1010. Further, the servo control circuit 1100 controls the rotation of a disc motor 1140 via the driving circuit 1110 so that the optical disc 1010 is rotated at the rotational speed specified by a microcomputer 1090.

A reflected light quantity detecting circuit 1040 generates a reflected light quantity signal which is a signal showing the quantity of the reflected light of a laser beam on the optical disc 1010 and a push-pull tracking error signal generating circuit 1070 generates a push-pull tracking error signal. In FIG. 1, only an output signal from the push-pull tracking error signal generating circuit 1070 is supplied to the microcomputer 1090, however, the push-pull tracking error signal generating circuit 1070 may be also controlled by the microcomputer 1090.

The operation for determining the type of the optical disc 1010 of the microcomputer 1090 will be described below using a flowchart shown in FIG. 2. After the optical disc 1010 is installed in an information reproducing apparatus, the microcomputer 1090 first executes a so-called focus sweep (2010) that the focus of a laser beam is moved in the focal direction at fixed speed via the servo control circuit 1100, the driving circuit 1110 and the focusing actuator 1130. The microcomputer 1090 inputs a reflected light quantity signal and a focus error signal in the focus sweep (2020) and calculates distance from the surface of the optical disc 1010 to the recording face based upon these signals (2030). For CD, CD-R and CD-RW, distance from the surface of the disc to the recording face is approximately 1.2 mm and for single-layer DVD-ROM, DVD-R, dual-layer DVD-ROM, DVD-RAM1, DVD-RAM2, DVD–RW and DVD+RW, the distance is approximately 0.6 mm. FIG. 3A shows a reflected light quantity signal and a focus error signal in case a focus sweep is performed on CD and FIG. 3B shows the reflected light quantity signal and the focus error signal in case a focus sweep is performed on DVD. In FIG. 3, a reference number 3010 denotes a signal showing the quantity of reflected light on the surface of the disc and 3020 denotes a signal showing the quantity of reflected light on the recording face of the disc. A reference number 3030 denotes a focus error signal acquired from the surface of the disc and 3040 denotes a focus error signal acquired from the recording face of the disc. Time Ta and Tb respectively denotes time from a component on the surface of the disc of the reflected light quantity signal and the focus error signal to a component on the recording face of the disc in case a focus sweep is performed and as the focus of a laser beam in the focus sweep is moved at fixed speed, distance from the surface of the disc to the recording face can be calculated by respectively measuring the time Ta and Tb and further, it can be judged whether the optical disc 1010 is CD or DVD.

The calculation of distance from the surface of the disc to the recording face by measuring the time Ta and Tb and the discrimination of the disc are also enabled by respectively comparing the time Ta and Tb with a predetermined value.

The predetermined values respectively compared with the time Ta and Tb are required to be set to values at which difference between distances from each surface of discs which are objects of discrimination to each recording face is discriminated and the disc can be discriminated.

For example, as distance from the surface of CD to the recording face is 0.6 mm and distance from the surface of DVD to the recording face is 1.2 mm, the disc can be judged as CD or DVD by comparing with the predetermined values at which difference between the distances can be discriminated.

Figure 4A:
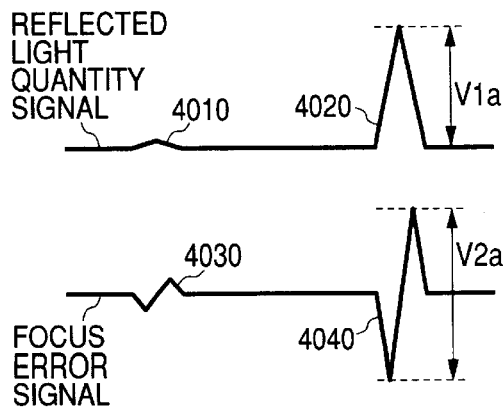
FIG. 4 respectively show the waveforms on the surface of the disc and on the recording face of the reflected light quantity signal and the focus error signal in case a focus sweep is performed on discs different in the reflectance.
Figure 4B:
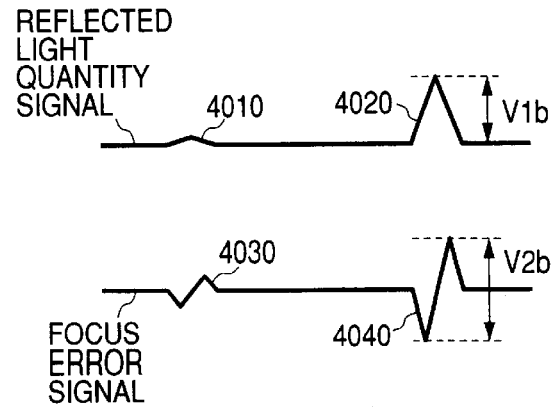

In case the optical disc 1010 is CD, the reflectance of the optical disc 1010 is calculated based upon the reflected light quantity signal and the focus error signal as the next operation (2040). For CD, the reflectance of CD and CD-R is 65% or more and that of CD-RW is 25% or less. FIG. 4A shows a reflected light quantity signal and a focus error signal in case a focus sweep is performed on the disc 1010 the reflectance of which is high such as CD and CD-R and FIG. 4B shows a reflected light quantity signal and a focus error signal in case a focus sweep is performed on the disc 1010 the reflectance of which is low such as CD-RW. In FIG. 4, a reference number 4010 denotes a signal showing the quantity of reflected light on the surface of the disc and 4020 denotes a signal showing the quantity of reflected light on the recording face of the disc. A reference number 4030 denotes a focus error signal acquired from the surface of the disc and 4040 denotes a focus error signal acquired from the recording face of the disc. Voltages V1a and V1b show the quantity of reflected light on the recording face of the disc and voltages V2a and V2b show the amplitude of a focus error signal acquired from the recording face of the disc. Therefore, the reflectance of the optical disc 1010 can be calculated by measuring the voltages V1a and V1b or the voltages V2a and V2b by the microcomputer 1090, in case the calculated reflectance is high, it can be determined that the optical disc 1010 is CD or CD-RW (2060) and in case the calculated reflectance is low, it can be determined that the optical disc 1010 is CD-RW (2050).

The acquisition of the reflectance of the disc by measuring the voltages V1a and V1b or the voltages V2a and V2b and the discrimination of the disc are also enabled by comparing the voltages V1a and V1b or the voltages V2a and V2b with predetermined values.

The predetermined values respectively compared with the voltages V1a and V1b or the voltages V2a and V2b are required to be set in consideration of each reflectance of discs which are objects of discrimination, the quantity of reflected light from each disc or each amplitude of a focus error signal.

For example, as the reflectance of CD and CD-R is 65% or more and that of CD-RW is 25% or less, the disc can be judged as CD, CD-R or CD-RW by comparing with the predetermined values at which difference between reflectances can be discriminated.

Generally, when optical discs are sorted in the order of higher reflectance, it is known that they are sorted in the order of CD, single-layer DVD (however, as difference in is the reflectance between CD and single-layer DVD is small, it may be also considered that they are equal in the reflectance), CD-R, dual-layer DVD, CD-RW, DVDRW (DVD–RW or DVD+RW) and DVD-RAM (however, as difference in the reflectance among CD-RW, DVD-RAM and DVDRW is small, it may be also considered that they are equal in the reflectance). Therefore, in case these discs are discriminated, predetermined values at which the corresponding reflectance can respectively be discriminated are required to be set based upon the reflectance of each disc.

Figure 5A:
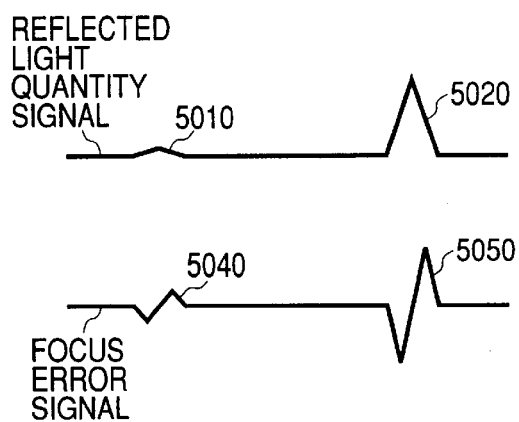
FIG. 5 respectively show the waveforms of the reflected light quantity signal and the focus error signal in case a focus sweep is performed on discs different in the number of disc recording faces.
Figure 5B:
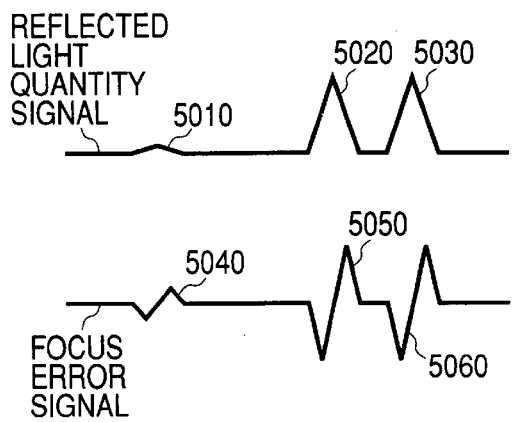

In case the optical disc 1010 is DVD, the number of recording layers of the optical disc 1010 is determined based upon a reflected light quantity signal and a focus error signal as the next operation (2070). FIG. 5A shows a reflected light quantity signal and a focus error signal in case a focus sweep is performed on a single-layer disc and FIG. 5B shows a reflected light quantity signal and a focus error signal in case a focus sweep is performed on a dual-layer disc. In FIG. 5, a reference number 5010 denotes a signal showing the quantity of reflected light on the surface of the disc, 5020 denotes a signal showing the quantity of reflected light on the a first recording face of the disc and 5030 denotes a signal showing the quantity of reflected light on the second recording face of the disc. A reference number 5040 denotes a focus error signal acquired from the surface of the disc, 5050 denotes a focus error signal acquired from the first recording face of the disc and 5060 denotes a focus error signal acquired from the second recording face of the disc. Therefore, the number of recording layers of the optical disc 1010 can be measured by counting the frequency of the occurrence of a reflected light quantity signal or a focus error signal in a focus sweep by the microcomputer 1090 and in case the number of recording layers is 2, the disc can be determined as dual-layer DVD-ROM.

Concretely, the disc can be judged to be dual-layers based upon 5030 of the reflected light quantity signal and 5060 of the focus error signal respectively shown in FIG. 5.

In case the optical disc 1010 is DVD and the number of recording faces is one, the reflectance of the optical disc 1010 is calculated based upon a reflected light quantity signal and a focus error signal as the next operation (2090). For single-layer DVD, the reflectance of single-layer DVD-ROM or single-layer DVD-R is 45% or more, the reflectance of DVD-RAM which is DVD-RAM1 or DVD-RAM2 is 15 to 25% and the reflectance of DVDRW which is DVD-RW or DVD+RW is 18 to 30%. Therefore, in case the reflectance of the optical disc 1010 is calculated and the calculated reflectance is high, it can be determined that the optical disc is single-layer DVD-ROM or single-layer DVD-R.

Figure 6A:
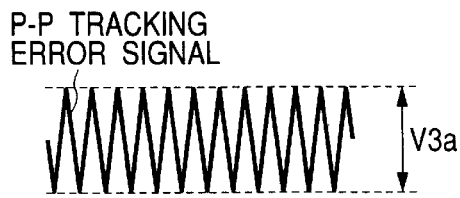
FIG. 6 respectively show the waveforms of push-pull tracking error signals of discs different in the amplitude of the push-pull tracking error signal.
Figure 6B:
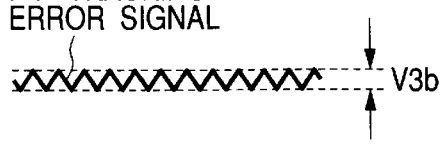

In case the optical disc 1010 is DVD-RAM which is DVD-RAM1 or DVD-RAM2 or DVDRW which is DVD-RW or DVD+RW, the amplitude of a push-pull tracking error signal is measured by the microcomputer (2120) in a state in which focus servo is turned on (2110) which is a state in which servo control is performed based upon a focus error signal as the next operation. DVD-RAM is manufactured so that the sensitivity of a push-pull tracking error signal is higher, compared with DVDRW. FIG. 6A shows a push-pull tracking error signal acquired from DVD-RAM and FIG. 6B shows a push-pull tracking error signal acquired from DVDRW. Voltages V3a and V3b show the amplitude of a push-pull tracking error signal, is measured by the microcomputer 1090 and the optical disc is determined based upon these values (2130). That is, in case the voltages are larger than predetermined values, the optical disc 1010 can be judged as DVD-RAM (2140) and in case the voltages are smaller than the predetermined values, the optical disc 1010 can be judged as DVDRW (2150).

The predetermined values compared with the voltages V3a and V3b are required to be set to values at which the disc which is an object can be discriminated based upon the amplitude of a tracking error signal respectively acquired from discs which are the objects of discrimination.

For example, in case there is an apparatus wherein the amplitude of V3b shown in FIG. 6B is 20 (that is, 20% of V3a) when the amplitude of V3a shown in FIG. 6A is estimated at 100, V3a (100) and V3b (20) can be identified by setting the above-mentioned predetermined values to 50 (that is, 50% of V3a) or 30 (that is, 30% of V3a). As a result, DVD-RAM and DVDRW can be discriminated.

However, the above-mentioned predetermined values are not limited to being set to 50% or 30% of V3a and have only to be values based upon the amplitude of each push-pull tracking error signal acquired from each disc which is an object of discrimination at which each tracking error signal can be identified.

To conversely represent, a value at which the amplitude of each push-pull tracking error signal acquired from each disc which is an object of discrimination can be identified is required to be set as the predetermined value.

After the type of the optical disc 1010 is determined according to the above-mentioned order, setting according to the type of the optical disc 1010 is applied to the whole apparatus (2160) and information recorded on the optical disc 1010 is reproduced (2170).

In the first embodiment, the tracking error signal generating circuit 1060 and the push-pull tracking error signal generating circuit 1070 are provided as different circuits.

This reason is that the push-pull tracking error signal generating circuit 1070 is provided separately in FIG. 1 to simply explain using a push-pull tracking error signal in the first embodiment.

Therefore, a push-pull tracking error signal is generated in the tracking error signal generating circuit 1060 and the tracking error signal generating circuit may be also connected to the microcomputer 1090 and the servo control circuit 1100.

Figure 7:
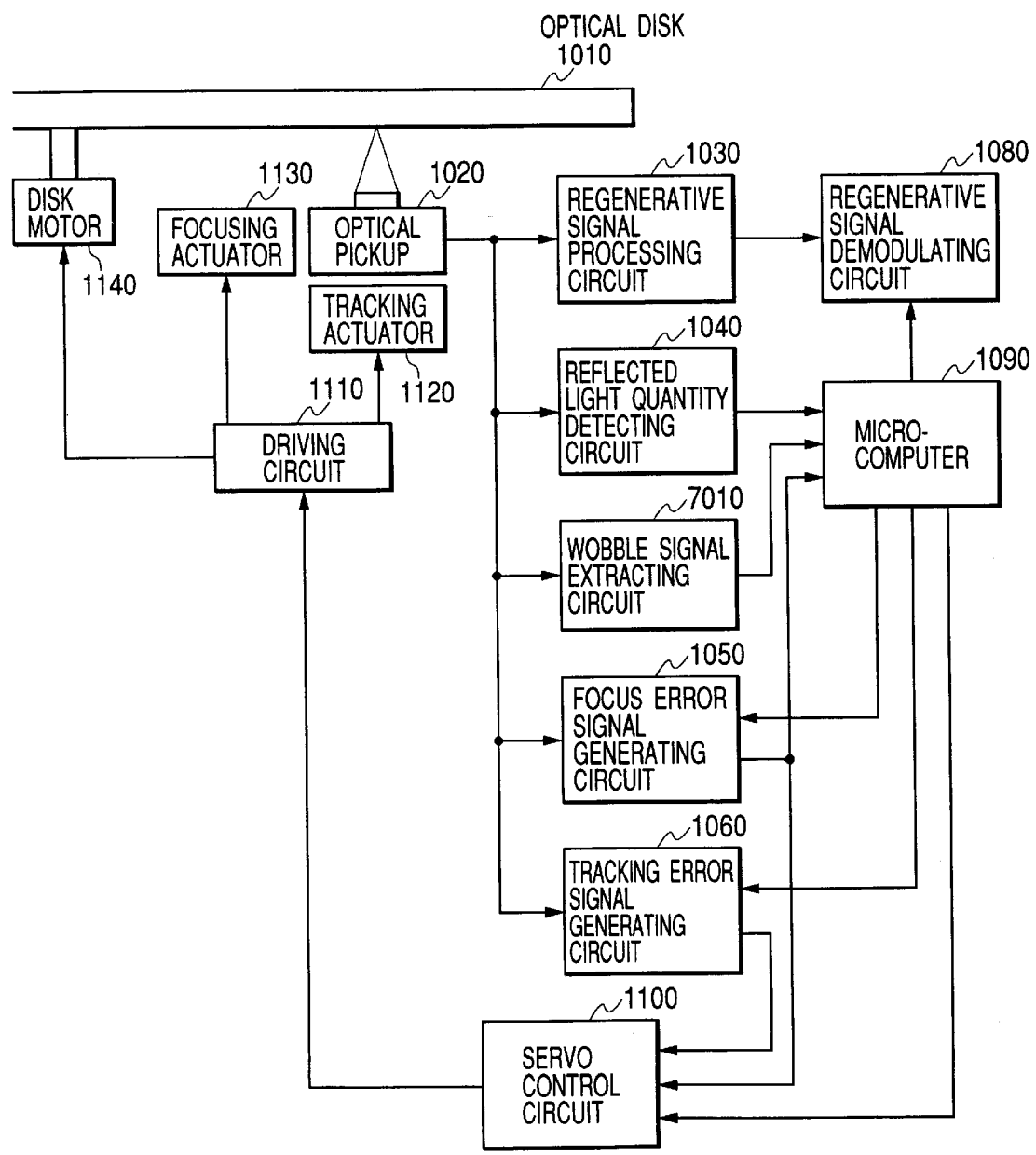
FIG. 7 is a block diagram showing the schematic configuration of an optical disc information reproducing apparatus equivalent to a second embodiment of the invention.

Next, a second embodiment of the invention will be described. FIG. 7 is a block diagram showing the schematic configuration of an optical disc information reproducing apparatus that discriminates a disc equivalent to the second embodiment of the invention and a block to which the same number as the block in FIG. 1 is allocated performs the same operation as that of the block in the first embodiment, the description is omitted. A wobble signal extracting circuit 7010 is a circuit that extracts a wobble signal normalized in relation to DVD-RAM from a signal output from an optical pickup 1040.

In FIG. 7, a signal output from the wobble signal extracting circuit 7010 is supplied to only a microcomputer 1090, however, the wobble signal extracting circuit 7010 may be also controlled by the microcomputer 1090.

The wobble signal extracting circuit 7010 is not only provided singly separately as shown in FIG. 7 but the processing may be also executed by another regenerative signal processing circuit 1030 and others.

Referring to a flowchart shown in FIG. 8, the operation for determining the type of an optical disc 1010 by the microcomputer 1090 in the second embodiment will be described below. As in processing having the same number in the flowchart shown in FIG. 8 as the processing in the flowchart shown in FIG. 2, the same operation as in the first embodiment is performed, the description is omitted. After the optical disc is determined as DVD-RAM or DVDRW in determination in 2090, focus servo and tracking servo are turned on under the setting of DVD-RAM (8010). Next, the output of the wobble signal extracting circuit 7010 is input to the microcomputer 1090 (8020). A wobble signal extracted by the wobble signal extracting circuit 7010 is different in the frequency between DVD-RAM and DVDRW. Therefore, in case the frequency of a wobble signal input to the microcomputer is that of a normal wobble signal complying with the standard of DVD-RAM, the optical disc 1010 can be determined as DVD-RAM and information on the disc is reproduced as it is (2160). In case the frequency of a wobble signal is that of an abnormal wobble signal which does not comply with the standard of DVD-RAM, the optical disc 1010 can be determined as DVDRW (2140), setting according to DVDRW is made (2150) and information on the optical disc 1010 is reproduced (2160).

In the second embodiment, the optical disc is determined based upon a state of a wobble signal, however, it is checked under the setting of DVD-RAM whether information on the disc can be reproduced or not and it can be determined whether the optical disc 1010 is DVD-RAM or DVDRW. That is, if information on the disc can be reproduced under the setting of DVD-RAM, the optical disc is determined as DVD-RAM and if information on the disc cannot be reproduced under the setting of DVD-RAM, the optical disc is determined as DVDRW.

Or if the determination of DVD-RAM is not based upon a fact that information on the disc can be reproduced but address information is acquired from the optical disc, the optical disc may be also determined as DVD-RAM.

Or determination in case the optical disc is DVDRW in the above-mentioned case may be also based upon that the frequency of a wobble signal is different from the setting of DVD-RAM after the setting of DVD-RAM, that information on the optical disc cannot be reproduced or that no address information is acquired from the optical disc.

Of course, the setting of DVDRW is first made, the similar processing to the above-mentioned processing is executed and it may be also determined whether the optical disc is DVDRW or not and further, whether the optical disc is DVD-RAM or not.

In the second embodiment, it is described that the optical disc is determined as DVD-RAM or DVDRW, however, the invention is not limited to this and can be also applied to the discrimination an optical disc on which a wobble signal is recorded. For example, as a wobble signal is also recorded on CD-R, CD-RW and DVD-R, the method described in the second embodiment can be also applied to the discrimination of these discs.

The frequency of a wobble signal can be identified in various methods, and a method of using a filter for extracting a specific frequency component and a method of identifying the frequency of a wobble signal based upon a frequency component included in a signal after the wobble signal passes a so-called low (high)-pass filter that passes a lower (higher) frequency than a specific frequency can be given. Or the frequency of a wobble signal can be also identified by a method of counting and identifying a divided wobble signal acquired by dividing an acquired wobble signal.

Processing for the apparatus that executes signal processing to synchronize is executed based upon a wobble signal acquired from the optical disc in recording or reproduction to/from the optical disc. At that time, generally, the acquired wobble signal is processed in a phase-locked loop (PLL) circuit. Therefore, the frequency of a wobble signal can be also identified by using a signal which can be acquired from the PLL circuit.

The above-mentioned specific frequency is also required to be set based upon a value determined in the specification of a wobble signal.

Figure 9:
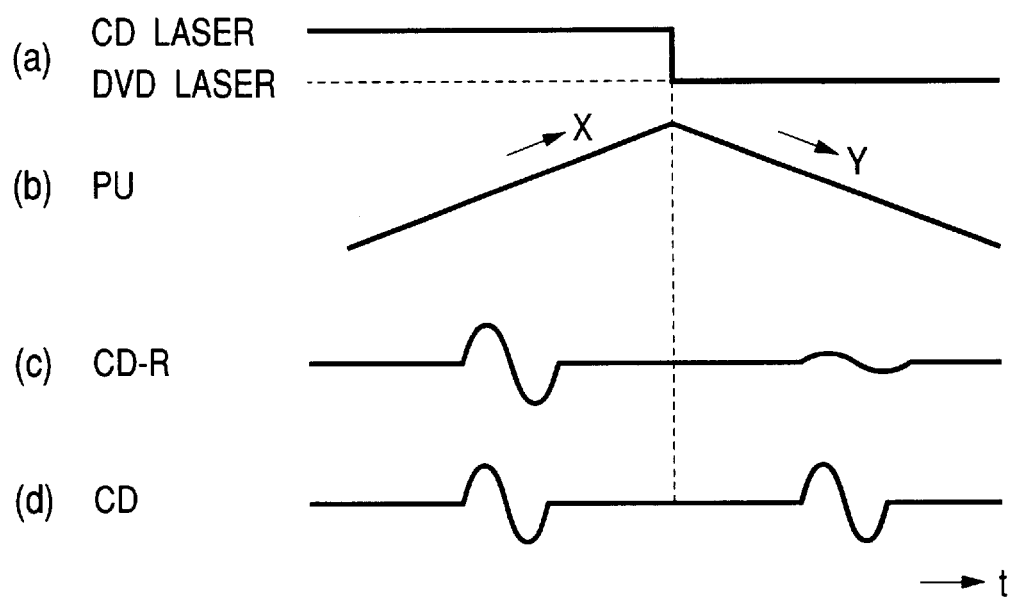
FIG. 9 is a schematic drawing for explaining a method of discriminating CD and CD-R.

Further, a third embodiment in which the disc discriminating methods according to the invention are combined will be described below. In the following embodiment, an optical disc unit can reproduce information on any optical disc of CD, CD-R, single-layer DVD, dual-layer DVD, CD-RW, DVD-RAM and DVDRW (DVD–RW or DVD+RW). Referring to FIG. 9, a method of discriminating these optical discs and an apparatus thereof will be described below.

FIG. 9 are schematic drawings for explaining a method of discriminating CD and CD-R and the x-axis shows time t. FIG. 9A is the schematic drawing showing the switching of a CD laser and a DVD laser, FIG. 9B is the schematic drawing showing the operation of an optical pickup, an arrow X in FIG. 9B shows the operation of the optical pickup 1 in case the optical pickup 1 is brought close to an optical disc and an arrow Y shows the operation of the optical pickup 1 in case the optical pickup 1 is separated from the optical disc, FIG. 9C shows a focus error signal acquired from CD-R and FIG. 9D shows a focus error signal acquired from CD.

CD-R can acquire a focus error signal of an amplitude according to the reflectance of the optical disc differently from another optical disc in case the CD laser radiates a laser beam on it, however, CD-R can hardly acquire a focus error signal in case the DVD laser radiates a laser beam on it. Therefore, the CD laser is used for determining whether the reflectance of an optical disc is large or not.

(1) In this embodiment, a laser beam is radiated on an optical disc from the CD laser, a focus error signal is acquired and it is determined based upon the focus error signal whether the reflectance of the optical disc installed in an optical disc unit is large or not.

(2) In the case of an optical disc the reflectance of which is small, that is, CD-RW and DVD-RAM, the time of a reflected signal from the surface of the optical disc and the time of a reflected signal from the recording face are measured as in the first embodiment and it is determined that the optical disc is CD-RW or DVD-RAM.

(3) In the case of an optical disc which belongs to a group the reflectance of which is large, that is, CD, CD-R, single-layer DVD and dual-layer DVD, first, the time of a reflected signal from the surface of the optical disc and the time of a reflected signal from the recording face are also measured, it is determined by a microcomputer 1090 whether the acquired time is longer than predetermined time or shorter and it is determined that the optical disc is CD or DVD. In case the time is short, it is known that the optical disc is DVD.

Therefore, in this embodiment, in case the time is long, it is determined that the optical disc is CD or CD-R and in case the time is short, it is determined that the optical disc is single-layer DVD or dual-layer DVD.

(4) After the optical disc is identified as single-layer DVD or dual-layer DVD based upon the above-mentioned (3), it can be determined that the optical disc is single-layer DVD or dual-layer DVD by selecting the DVD laser as in the first embodiment and counting the number of focus error signals.

(5) In case it is determined that the optical disc is CD, that is, CD or CD-R as a result of measuring the time from the surface of the optical disc and the time from the recording face based upon the above-mentioned (3), a laser beam is radiated on the optical disc from the CD laser, bringing the optical pickup 1 close to the optical disc as shown by the arrow X. Next, the optical pickup 1 is separated from the optical disc 2, radiating a laser beam on the optical disc from the DVD laser. As described above, the optical pickup 1 detects a laser beam radiated on the optical disc, a signal processing circuit 3 generates a focus error signal and inputs it to the microcomputer 1090. In case the optical disc is CD-R, as the amplitude of a focus error signal also acquired by radiating a laser beam from the DVD laser is extremely small, a focus error signal is hardly detected. Therefore, in the case of CD-R, only when a laser beam is radiated from the CD laser, a focus error signal is acquired. However, in the case of CD, in case a laser beam is radiated from the CD laser and in case a laser beam is radiated from the DVD laser, the amplitude hardly changes and a focus error signal can be acquired. Therefore, when the microcomputer 1090 counts the number of focus error signals, only one focus error signal is acquired in the case of CD-R, however, in the case of CD, as two focus error signals are acquired, it can be determined depending upon the number of focus error signals whether the optical disc is CD or CD-R.

In this embodiment, in case the optical pickup 1 is brought close to the optical disc, the CD laser is used and in case the optical pickup 1 is separated from the optical disc, the DVD laser is used, however, conversely, in case the optical pickup 1 is brought close to the optical disc, the DVD laser may be also used and in case the optical pickup 1 is separated from the optical disc, the CD layer may be also used.

(6) In the case of a group the reflectance of which is small, that is, CD-RW, DVD-RAM and DVDRW in the above-mentioned (2), first, the time of a reflected signal from the surface of the optical disc and the time of a reflected signal from the recording face are also measured, it is determined by the microcomputer 1090 whether acquired time is longer than predetermined time or shorter and it is determined that the optical disc is CD or DVD. In case the time is short, it is known that the optical disc is DVD.

Therefore, in this embodiment, in case the time is long, it is determined that the optical disc is CD-RW and in case the time is short, it is determined that the optical disc is DVD-RAM or DVDRW.

Figure 2:
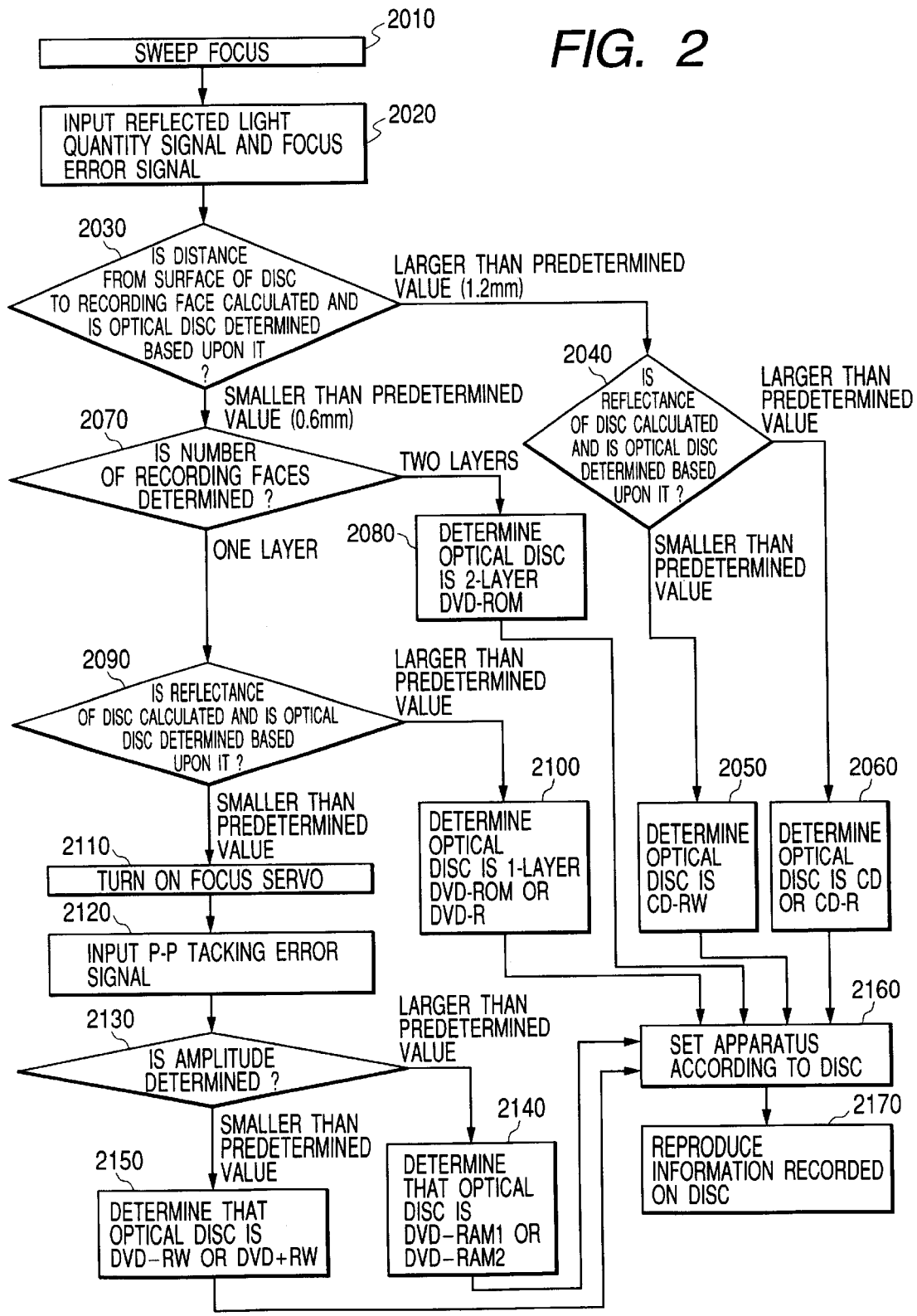
FIG. 2 is a flowchart showing the operation of the optical disc information reproducing apparatus equivalent to the first embodiment of the invention until the information of a disc is reproduced.
Figure 3A:
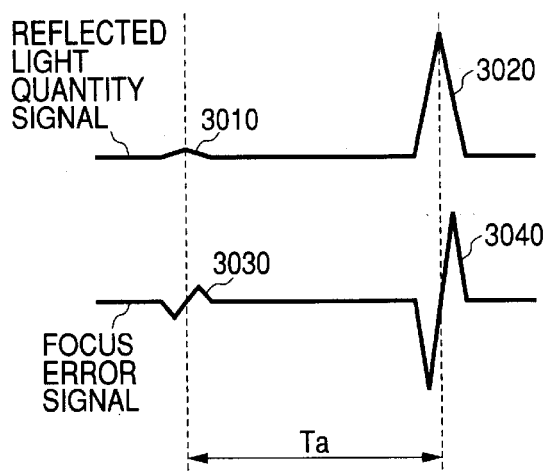
FIG. 3 respectively show the waveforms of a reflected light quantity signal and a focus error signal in case a focus sweep is performed on discs different in distance from the surface to the recording face.
Figure 3B:
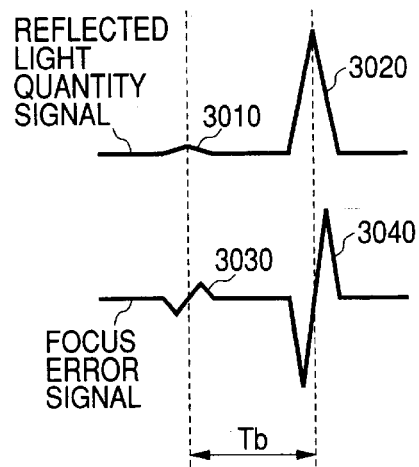
Figure 8:
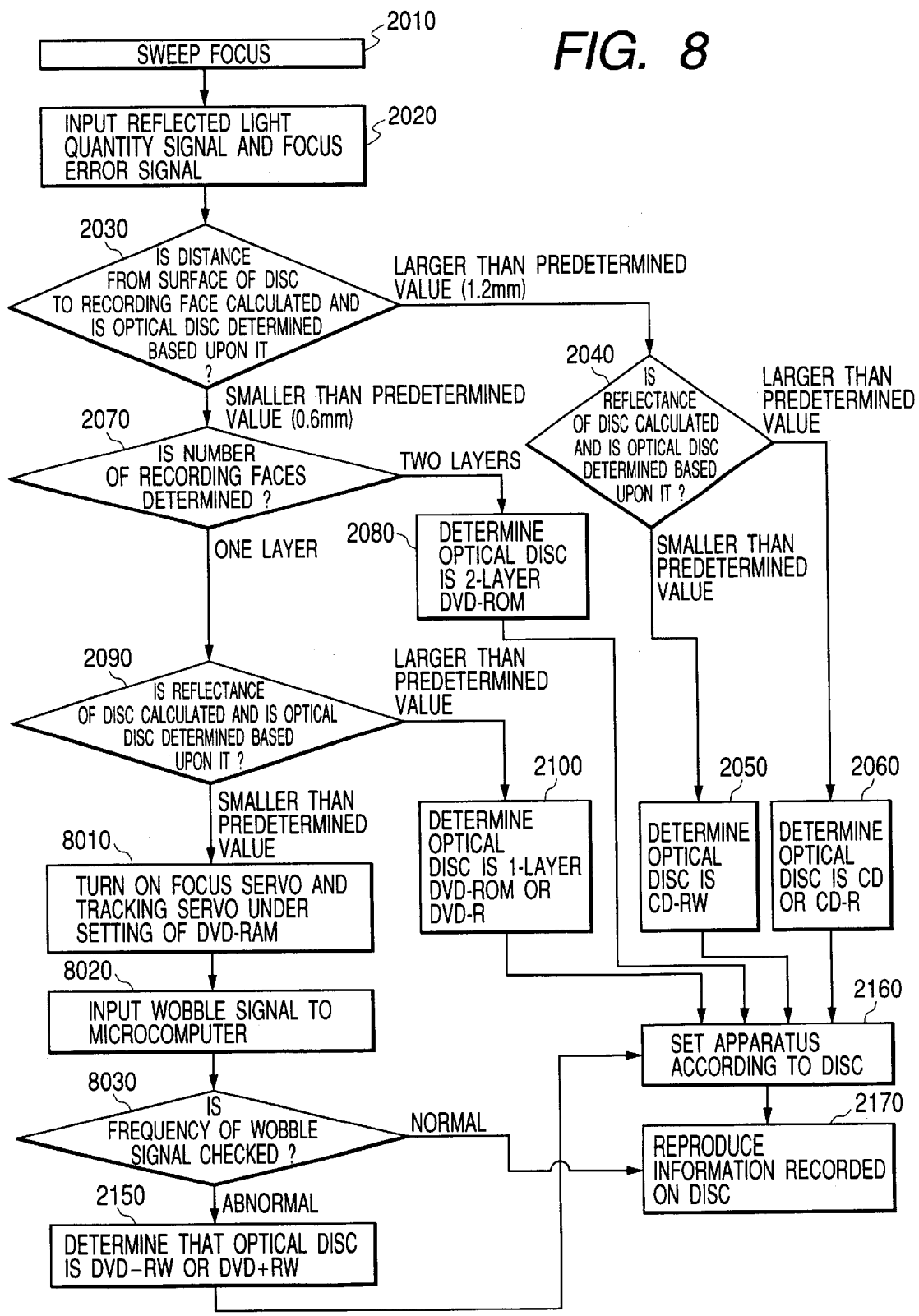
FIG. 8 is a flowchart showing the operation of the optical disc information reproducing apparatus equivalent to the second embodiment of the invention until the information of a disc is reproduced.

(7) In case it is determined that the optical disc is DVD-RAM or DVDRW in the above-mentioned (6), it can be determined which of DVD-RAM or DVDRW the optical disc is by executing the processing after (2110) in the flowchart shown in FIG. 2 in the first embodiment or the processing after (8010) in the flowchart shown in FIG. 8 in the second embodiment.

As described above, in the above-mentioned embodiments, the optical disc unit can determine which of CD, CD-R, single-layer DVD, dual-layer DVD, CD-RW, DVD-RAM and DVDRW the optical disc is.

In case the optical disc installed in the optical disc unit is determined by the microcomputer 1090, the laser according to the optical disc is selected according to an instruction from the microcomputer 1090, conditions of tracking servo and focus servo are set according to the installed optical disc and if necessary, a condition of the rotational control of a drive motor (not shown) can be set.

As clear from the above description, in an optical disk unit where only one type of CD and one type of DVD can be installed, it can be determined by measuring the time of a reflected signal from the surface of the optical disc and the time of a reflected signal from the recording face whether the optical disc is CD or DVD.

Further, in the case of an optical disc unit where only single-layer DVD and dual-layer DVD can be installed or only information on them can be reproduced, these optical discs can be discriminated by counting the number of focus error signals, bringing the optical pickup close to the optical disc or separating the optical pickup from the optical disc.

As described above, according to the invention, in the case of a disc small in the quantity of reflected light, distance to the recording face and recording track pitch, the disc can be also easily determined.

Therefore, if the invention is applied to discriminating DVD-RAM which is DVD-RAM1 or DVD-RAM2 and DVDRW which is DVD-RW or DVD+RW respectively which cannot be determined based upon distance from the surface of the disc to the recording face, the number of recording faces and the reflectance, the disc can be easily determined.

However, it need scarcely be said that the invention cannot only be applied to discriminating DVD-RAM and DVDRW but can be applied to discriminating discs having difference in the amplitude of a push-pull tracking error signal.

The invention is not limited to discriminating CD and DVD and for example, an optical disc on which information is recorded at higher density than DVD can be also discriminated by using the invention.

Further, the disc discriminating method provided by the invention can be also executed together with another disc discriminating method and for example, in the above-mentioned reference example, the disc discriminating method may be also executed together with disc discriminating methods disclosed in JP-A Nos. H11-306650, No. H10-334574, No. H9-44982 and No. H8-249801.

What is claimed is:

1. A disc discriminating method of discriminating a type of an optical disc, comprising:
   executing focus servo;
   acquiring a push-pull tracking error signal from the optical disc;
   determining that the optical disc is DVD-RAM based upon that the amplitude of the tracking error signal is larger than a predetermined value; and
   determining that the optical disc is DVD-RW or DVD+RW based upon that the amplitude of the tracking error signal is smaller than the predetermined value.

2. A disc discriminating method of discriminating a type of an optical disc, comprising:
   executing focus servo for DVD-RAM;
   executing tracking servo for DVD-RAM; and
   determining that the optical disc is DVD-RAM based upon that a wobble signal acquired from the optical disc is a frequency for DVD-RAM.

3. A disc discriminating method of discriminating a type of an optical disc, comprising:
   executing focus servo for DVD-RW or DVD+RW;
   executing tracking servo for DVD-RW or DVD+RW; and
   determining that the optical disc is DVD-RW or DVD+RW based upon that a wobble signal acquired from the optical disc is a frequency for DVD-RW or DVD+RW.

4. A disc discriminating method of discriminating DVD-RAM and DVD-RW or DVD+RW as a type of an optical disc, comprising:
   executing focus servo for DVD-RAM;
   executing tracking servo for DVD-RAM;
   determining that the optical disc is DVD-RAM based upon that a wobble signal acquired from the optical disc is a frequency for DVD-RAM; and
   determining that the optical disc is DVD-RW or DVD+RW based upon that a wobble signal acquired from the optical disc is different from a frequency for DVD-RAM.

5. A disc discriminating method, comprising:
   (a) discriminating the type of an optical disc based upon the time of a reflected signal acquired from the surface of the optical disc installed in an optical disc unit and the time of a reflected signal acquired from the recording face;
   (b) discriminating the type of an optical disc based upon the reflectance of the optical disc, after (a); and
   (c) discriminating the type of the optical disc based upon a tracking error signal acquired from the optical disc, after (b).

6. A disc discriminating method comprising:
   (a) discriminating the type of an optical disc based upon the time of a reflected signal acquired from the surface of the optical disc installed in an optical disc unit and the time of a reflected signal acquired from the recording face;
   (b) discriminating the type of an optical disc based upon the reflectance of the optical disc, after (a)
   (c) determining the number of the recording faces of an optical disc based upon a focus error signal acquired from the recording face of the optical disc; and/or discriminating the type of the optical disc based upon whether the amplitude value of the reflected light of a laser beam from different lasers is large or not, after (b); and
   (d) discriminating the type of the optical disc based upon a tracking error signal acquired from the optical disc, after (c).

7. A disc information reproducing apparatus, comprising:
   an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein the disc discriminating method according to claim 1 is executed.

8. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

a wobble signal extracting circuit that extracts a wobble signal from the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein the disc discriminating method according to claim 2 is executed.

9. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

a wobble signal extracting circuit that extracts a wobble signal from the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein it is determined based upon the tracking error signal acquired from the tracking error signal generating circuit that the type of the optical disc is DVD-RAM or DVD–RW or DVD+RW.

10. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

a wobble signal extracting circuit that extracts a wobble signal from the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein it is determined based upon the wobble signal acquired from the wobble signal extracting circuit that the type of the optical disc is DVD-RAM or DVD–RW or DVD+RW.

11. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein the disc discriminating procedure according to claim 5 is executed.

12. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein the disc discriminating procedure according to claim 6 is executed.

13. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

a wobble signal extracting circuit that extracts a wobble signal from the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and control circuit that at least controls the information reproducing circuit and the servo control circuit, wherein the disc discriminating procedure according to claim 3 is executed.

14. A disc information reproducing apparatus, comprising:

an optical pickup that radiates a laser beam on the optical disc and detects a signal based upon reflected light from the optical disc;

an information reproducing circuit that reproduces information recorded on the optical disc based upon the signal detected by the optical pickup;

a focus error signal generating circuit that generates a focus error signal based upon the signal detected by the optical pickup;

a tracking error signal generating circuit that generates a tracking error signal based upon the signal detected by the optical pickup;

a wobble signal extracting circuit that extracts a wobble signal from the signal detected by the optical pickup;

an actuator that controls the position of a laser beam radiated from the optical pickup;

a disc motor that rotates the optical disc;

a driving circuit that drives the actuator and the disc motor;

a servo control circuit that controls the driving circuit based upon the focus error signal or the tracking error signal; and a control circuit that at least controls the information reproducing circuit and the servo control circuit, wherein the disc discriminating procedure according to claim 4 is executed.

* * * * *